(12) United States Patent
Phua et al.

(10) Patent No.: US 9,046,120 B2
(45) Date of Patent: Jun. 2, 2015

(54) THREADED FASTENER

(75) Inventors: Cheng Siong Phua, Singapore (SG); Senthilukumaran Kothandaraman, Cuddalore (IN)

(73) Assignee: Infastech Intellectual Properties Pte. Ltd, Singapore (SG)

( * ) Notice: Subject to any disclaimer, the term of this patent is extended or adjusted under 35 U.S.C. 154(b) by 0 days.

(21) Appl. No.: 13/249,387

(22) Filed: Sep. 30, 2011

(65) Prior Publication Data

US 2012/0257945 A1 Oct. 11, 2012

(30) Foreign Application Priority Data

Oct. 1, 2010 (SG) .................................. 201007309

(51) Int. Cl.
*F16B 25/00* (2006.01)
*F16B 33/02* (2006.01)

(52) U.S. Cl.
CPC ......... *F16B 25/0047* (2013.01); *F16B 25/0052* (2013.01); *F16B 33/02* (2013.01); *F16B 25/0078* (2013.01)

(58) Field of Classification Search
USPC .......................... 411/411, 414, 416, 386, 423
See application file for complete search history.

(56) References Cited

U.S. PATENT DOCUMENTS

| | | | |
|---|---|---|---|
| 877,131 A | | 1/1908 | Jordan |
| 1,229,560 A | * | 6/1917 | Whiteman ..................... 411/411 |
| 3,207,023 A | | 9/1965 | Knohl |
| 3,748,949 A | * | 7/1973 | Dreger .......................... 411/411 |
| 4,040,327 A | * | 8/1977 | Otaki ............................. 411/423 |
| 4,544,313 A | | 10/1985 | Grossberndt |
| 4,652,194 A | * | 3/1987 | Tajima et al. ................. 411/417 |
| 4,842,467 A | * | 6/1989 | Armstrong .................... 411/399 |
| 4,854,311 A | | 8/1989 | Steffee |
| 4,861,210 A | * | 8/1989 | Frerejacques ................. 411/411 |
| 4,907,926 A | * | 3/1990 | Wing .......................... 411/366.3 |
| 5,425,407 A | | 6/1995 | Archuleta et al. |
| 5,544,993 A | | 8/1996 | Härle |
| 5,704,750 A | | 1/1998 | Bartos et al. |
| 5,885,041 A | * | 3/1999 | Giannuzzi et al. .............. 411/82 |
| 6,095,733 A | | 8/2000 | Busby et al. |

(Continued)

FOREIGN PATENT DOCUMENTS

| | | |
|---|---|---|
| DE | 2754870 A1 | 6/1979 |
| EP | 0599211 | 6/1994 |

(Continued)

OTHER PUBLICATIONS

Written Opinion of related PCT/SG2011/000345; Jan. 30, 2012.

(Continued)

*Primary Examiner* — Flemming Saether
(74) *Attorney, Agent, or Firm* — Hahn, Loeser & Parks, LLP; Rex W. Miller, II (57) ABSTRACT

A threaded fastener having a threaded portion with a ratio of pitch diameter to minor diameter less than 1.28, and the threaded portion with a major diameter portion, a leading flank having a normal angle between 10° and 60°, a trailing flank having a normal angle between 1° and 30°, and a shank portion extending between the trailing flank and the leading flank of adjacent threads of a arcuate surface having a radius greater than the thread height. The arcuate surface forming the shank portion may have a radius between 1.2 and 1.8 times the thread height.

12 Claims, 11 Drawing Sheets

(56) References Cited

U.S. PATENT DOCUMENTS

| | | | |
|---|---|---|---|
| 6,113,331 A | 9/2000 | Grossberndt et al. | |
| 6,158,939 A | 12/2000 | Grossberndt et al. | |
| 6,322,307 B1 * | 11/2001 | Glover | 411/412 |
| 6,332,741 B1 * | 12/2001 | Janusz | 411/412 |
| 6,375,401 B1 * | 4/2002 | McNeill | 411/416 |
| 6,394,726 B1 | 5/2002 | Garvick | |
| 6,565,302 B2 * | 5/2003 | Werner et al. | 411/411 |
| 6,604,901 B1 | 8/2003 | Gossberndt et al. | |
| 6,672,813 B1 | 1/2004 | Kajita et al. | |
| 6,702,537 B2 | 3/2004 | Neuhengen | |
| 6,722,833 B2 | 4/2004 | Birkelbach | |
| 7,708,738 B2 | 5/2010 | Fourcault et al. | |
| 2010/0094352 A1 | 4/2010 | Iott et al. | |

FOREIGN PATENT DOCUMENTS

| | | |
|---|---|---|
| EP | 0948719 B1 | 10/1999 |
| EP | 1172572 | 1/2002 |
| JP | 2002115442 | 4/2002 |
| TW | I226411 | 1/2005 |
| TW | I318667 | 12/2009 |
| WO | 99/05421 | 2/1999 |
| WO | 2009101751 A1 | 8/2009 |

OTHER PUBLICATIONS

PCT International Search Report of related PCT/SG2011/000345; Jan. 30, 2012.

* cited by examiner

|  | A 08 | A 10 | A 12 | A 14 | A 16 | A 18 | A 20 | A 22 |
|---|---|---|---|---|---|---|---|---|
| $D_M$ | 0.8 | 1.2 | 1.2 | 1.4 | 1.6 | 1.8 | 2.0 | 2.2 |
| $d_t$ | 0.641 | 0.799 | 0.941 | 1.078 | 1.22 | 1.367 | 1.523 | 1.735 |
| $d_l$ | 0.605 | 0.756 | 0.890 | 1.021 | 1.156 | 1.296 | 1.445 | 1.656 |
| $d_m$ | 0.515 | 0.634 | 0.780 | 0.913 | 1.050 | 1.197 | 1.352 | 1.514 |
| P | 0.406 | 0.455 | 0.510 | 0.571 | 0.640 | 0.711 | 0.782 | 0.85 |
| R | 0.247 | 0.277 | 0.311 | 0.348 | 0.391 | 0.434 | 0.476 | 0.518 |
| a | 0.203 | 0.228 | 0.255 | 0.286 | 0.320 | 0.356 | 0.391 | 0.425 |
| b | 0.08 | 0.08 | 0.08 | 0.08 | 0.08 | 0.08 | 0.08 | 0.08 |
| $d_p$ | 0.552 | 0.723 | 0.880 | 1.036 | 1.185 | 1.328 | 1.467 | 1.602 |
| $D_M/d_m$ | 1.55 | 1.58 | 1.54 | 1.53 | 1.52 | 1.50 | 1.48 | 1.45 |
| $d_p/d_m$ | 1.072 | 1.140 | 1.128 | 1.135 | 1.129 | 1.109 | 1.085 | 1.058 |
| $H=((D_M-d_m)/2$ | 0.143 | 0.183 | 0.210 | 0.244 | 0.275 | 0.302 | 0.324 | 0.343 |
| R/H | 1.73 | 1.51 | 1.48 | 1.43 | 1.42 | 1.44 | 1.47 | 1.51 |
| $R_L$ | 0.312 | 0.338 | 0.371 | 0.403 | 0.446 | 0.495 | 0.552 | 0.630 |
| $R_L/H$ | 2.19 | 1.85 | 1.77 | 1.66 | 1.62 | 1.64 | 1.70 | 1.84 |

Fig. 11

|  | A 25 | A 30 | A 35 | A 40 | A 45 | A 50 | A 60 |
|---|---|---|---|---|---|---|---|
| $D_M$ | 2.5 | 3.0 | 3.5 | 4.0 | 4.5 | 5.0 | 6.0 |
| $d_t$ | 1.971 | 2.376 | 2.799 | 3.240 | 3.636 | 4.056 | 4.847 |
| $d_l$ | 1.890 | 2.278 | 2.684 | 3.075 | 3.488 | 3.891 | 4.655 |
| $d_m$ | 1.730 | 2.080 | 2.444 | 2.800 | 3.165 | 3.525 | 4.25 |
| P | 0.950 | 1.119 | 1.290 | 1.480 | 1.629 | 1.802 | 2.128 |
| R | 0.655 | 0.772 | 0.890 | 1.021 | 1.123 | 1.243 | 1.468 |
| a | 0.475 | 0.560 | 0.645 | 0.740 | 0.815 | 0.901 | 1.064 |
| b | 0.10 | 0.10 | 0.10 | 0.10 | 0.10 | 0.10 | 0.15 |
| $d_p$ | 1.894 | 2.307 | 2.634 | 2.961 | 3.288 | 3.614 | 4.528 |
| $D_M/d_m$ | 1.45 | 1.44 | 1.43 | 1.43 | 1.42 | 1.42 | 1.41 |
| $d_p/d_m$ | 1.095 | 1.109 | 1.078 | 1.058 | 1.039 | 1.025 | 1.065 |
| $H=((D_M-d_m)/2$ | 0.385 | 0.460 | 0.528 | 0.600 | 0.668 | 0.738 | 0.875 |
| R/H | 1.70 | 1.68 | 1.68 | 1.70 | 1.68 | 1.69 | 1.68 |
| $R_L$ | 0.692 | 0.833 | 0.980 | 1.145 | 1.269 | 1.417 | 1.632 |
| $R_L/H$ | 1.80 | 1.81 | 1.86 | 1.91 | 1.90 | 1.92 | 1.87 |

THREADED FASTENER

BACKGROUND AND SUMMARY

The present invention relates generally to threaded fasteners of any size, and may be useful for threaded fasteners having a major diameter between about 0.8 millimeter and about 6 millimeter.

Threaded fasteners such as screws are used in many applications to connect one component or part to another. Many screws are installed through a portion of one component and threaded into second component to clamp the components together. Many component shapes and configurations have been contemplated for retaining a threaded fastener, such as a blind or through hole formed in the component for engaging the threads of the fastener. The blind or through hole may be provided in an embossment or may be provided in the component material thickness.

Many applications including automotive, electronic, and consumer products require threaded fasteners that maintain desired clamping forces through vibration and other in-use loads. A common problem with prior fasteners included loosening under vibration. Other prior fasteners stripped too easily during installation providing reduced clamping and premature assembly failure. Certain prior fasteners create excessive radial stress around the hole during installation, particularly in an embossment, that weakens the component and may cause premature assembly failure.

Fastener coatings have been developed to compensate for some of the failures of prior fasteners, such as thread-sealing adhesives, thread lubricants, and anti-vibration coatings. However, thread coatings require additional material cost and application cost, and are increasingly difficult to apply as fastener sizes become smaller. There remains a need for a threaded fastener that overcomes these and other disadvantages of the prior art.

We have found that increasing the range of seating torque for installing the fastener, or the seating torque window, reduces strip-out failures by providing for greater variability of the screw driver. Therefore, what is disclosed is a threaded fastener comprising a threaded portion with a ratio of pitch diameter to minor diameter less than 1.28, and the threaded portion with a major diameter portion, a leading flank having a normal angle between 10° and 60°, a trailing flank having a normal angle between 1° and 30°, and a shank portion extending between the trailing flank and the leading flank of adjacent threads of a arcuate surface having a radius greater than the thread height. The ratio between the axial length of the shank portion to thread height may be between 1.5 and 3.0. The arcuate surface forming the shank portion may have a radius between 1.2 and 1.8 times the thread height.

The normal angle of the leading flank of the threaded portion may be greater than the normal angle of the trailing flank of the threaded portion. Alternatively or in addition, the normal angle of the leading flank of the threaded portion may be between 1.5 and 2.5 times the normal angle of the trailing flank of the threaded portion. Alternatively, the normal angle of the leading flank and the normal angle of the trailing flank may be substantially the same. In yet another alternative, the normal angle of the leading flank and the normal angle of the trailing flank may be compound angles.

The threaded fastener may be adapted to assemble parts made from materials of plastic, brass, aluminum, wood, concrete, and steel.

The threaded fastener may include a plurality of grooves extending transversely through the major diameter portion of the threaded portion. Alternatively or in addition, the threaded fastener may include a plurality of grooves extending transversely through the major diameter portion of adjacent threads of the threaded portion.

The major diameter portion of the threaded portion may be tapered toward the leading flank, the trailing flank, or both. Alternatively, the major diameter portion of the threaded portion may be arcuate.

The threaded fastener may have at least one minor protrusion formed along at least a portion of the shank portion of the threaded portions positioned between the trailing flank and the leading flank of adjacent threads. The minor protrusion may be continuous along the shank portion positioned between the trailing flank and the leading flank of adjacent threads. Alternatively, the minor protrusion may be intermittent along at least a portion of the shank portion positioned between the trailing flank and the leading flank of adjacent threads. The height of the minor protrusion may be not more than 30% of the thread height. Alternatively, the height of the minor protrusion may be not more than 20% of the thread height. At least a part of the minor protrusion may have a cross-sectional shape selected from the group consisting of arcuate, rectangular, elliptical, trapezoidal, and triangular. A lead side of the minor protrusion may have a normal angle between 10° and 60°.

Also disclosed is a threaded fastener comprising a threaded portion with a major diameter portion, a leading flank having a normal angle between 1° and 60°, a trailing flank having a normal angle between 1° and 60°, and a shank portion extending between the trailing flank and the leading flank of adjacent threads, and at least one minor protrusion formed along at least a portion of the shank portion of the threaded portions positioned between the trailing flank and the leading flank of adjacent threads.

The minor protrusion may be continuous along the shank portion positioned between the trailing flank and the leading flank of adjacent threads. Alternatively, the minor protrusion may be intermittent along at least a portion of the shank portion positioned between the trailing flank and the leading flank of adjacent threads. The height of the minor protrusion may be not more than 30% of the thread height. Alternatively, the height of the minor protrusion may be not more than 20% of the thread height. At least a part of the minor protrusion may have a cross-sectional shape selected from the group consisting of arcuate, rectangular, elliptical, trapezoidal, and triangular. A lead side of the minor protrusion may have a normal angle between 10° and 60°.

The leading flank of the fastener may have a normal angle between 10° and 60°, and the trailing flank may have a normal angle between 1° and 30°.

BRIEF DESCRIPTION OF THE DRAWINGS

FIG. 11 is a table of parameters of one application of threaded fastener for various sizes of threaded fastener having a major diameter between about 0.8 millimeter and 2.2 millimeter, FIG. 12 is a table of parameters of one application of threaded fastener for various sizes of threaded fastener having a major diameter between about 2.5 millimeter and 6 millimeter.

DETAILED DESCRIPTION OF THE DRAWINGS

Figure 1:
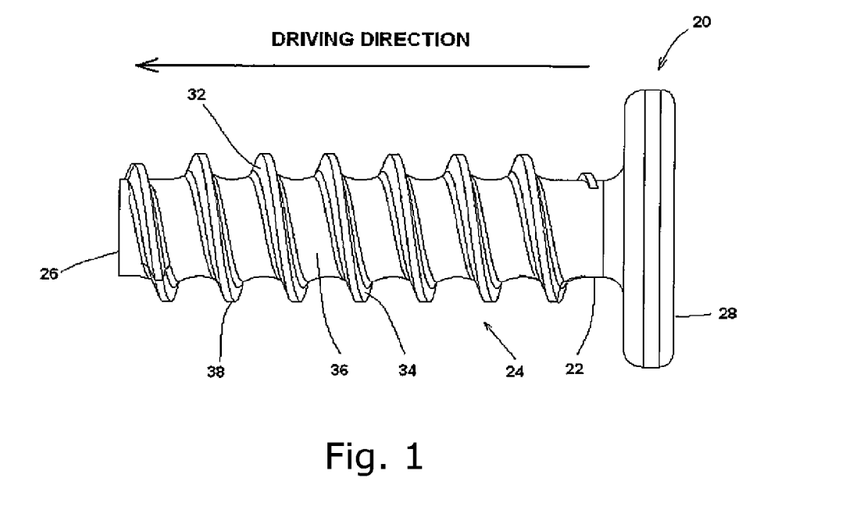
FIG. 1 is a plan view of a threaded fastener of the present disclosure.
Figure 3:
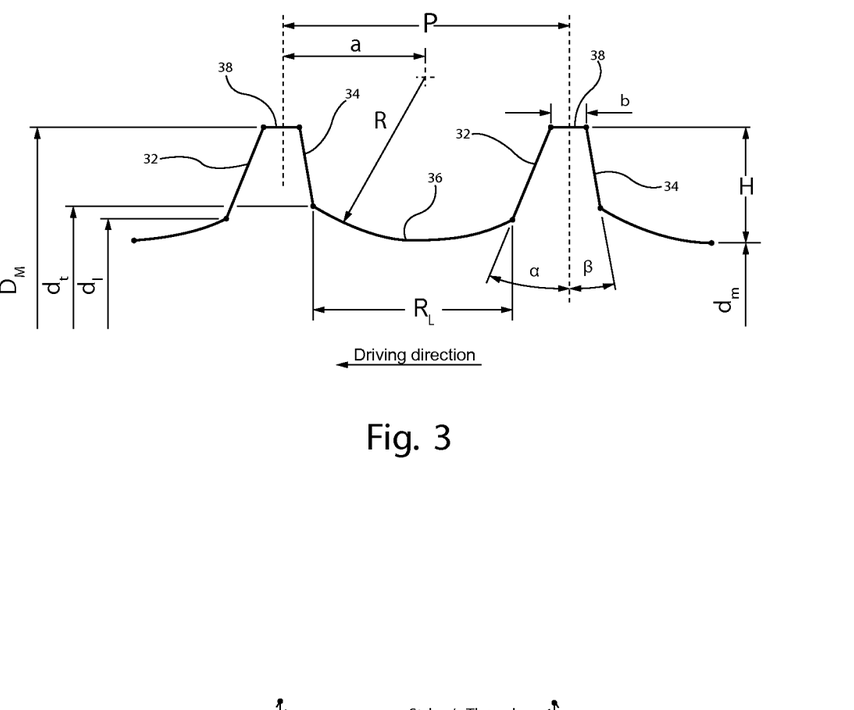
FIG. 3 is an enlarged view of a thread form according to the present disclosure.

Referring now to FIG. 1, a threaded fastener 20 includes an elongated shank 22 having a threaded portion 24 along at least a portion of the shank 22, a lead end 26, and a head 28. The threaded portion 22 has a screw thread disposed helically around the shank 22, the adjacent threads axially separated by the distance of the pitch P, as shown in FIG. 3. The screw thread includes a leading flank 32 and a trailing flank 34, and a shank portion 36 extending between the trailing flank and the leading flank of adjacent threads. The thread tip 38, or the major diameter portion 38, is the outer portion of the thread between an end of the leading flank 32 and an end of the trailing flank 34 defining the major diameter $D_M$ of the threaded fastener.

The threaded portion 24 may have a ratio of pitch diameter $d_p$ to minor diameter $d_m$ less than 1.28. Alternatively, the ratio of pitch diameter $d_p$ to minor diameter $d_m$ may be less than 1.15. In yet another alternative, the ratio of pitch diameter $d_p$ to minor diameter $d_m$ may be less than 1.12. The pitch diameter $d_p$ is defined as the diameter above the minor diameter $d_m$ where the dimension through the thread at the pitch diameter is equal to the distance between adjacent threads at the same diameter.

Figure 4:
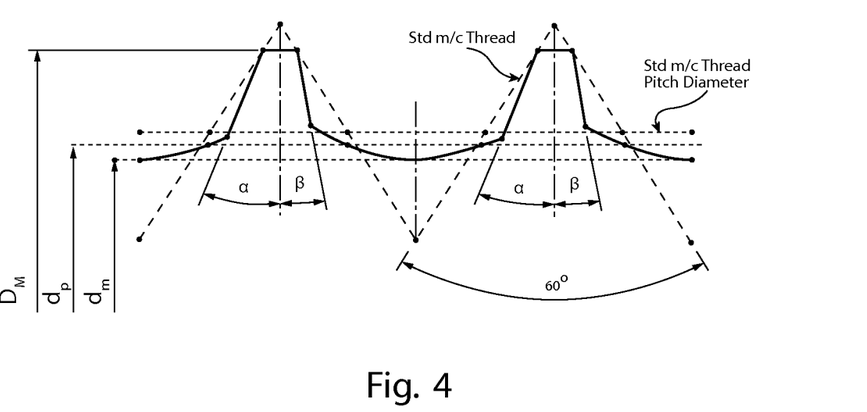
FIG. 4 is an enlarged view of the thread form of FIG. 3 contrasting a standard thread form.

The leading flank 32 is angled toward the lead end 26 defined in profile by an angle between the leading flank 32 and a plane normal to the longitudinal axis of the fastener, or normal angle α, as shown in FIGS. 3 and 4. The trailing flank 34 is angled toward the head 28 defined in profile by an angle between the trailing flank 34 and a plane normal to the longitudinal axis of the fastener, or normal angle β, as shown in FIGS. 3 and 4. The normal angle α of the leading flank 32 may be greater than the normal angle β of the trailing flank 34. Alternatively or in addition, the normal angle α of the leading flank 32 of the threaded portion 24 may be between 1.5 and 2.5 times the normal angle β of the trailing flank 34 of the threaded portion 24. Alternatively, the normal angle α of the leading flank 32 and the normal angle β of the trailing flank 34 may be substantially the same.

The leading flank 32 may have a normal angle α between about 10° and 60°, and the trailing flank 34 may have a normal angle β between about 1° and 30°. Alternatively, the leading flank 32 may have a normal angle α between about 15° and 40°, and the trailing flank 34 may have a normal angle β between about 5° and 20°. In one application, the leading flank 32 may have a normal angle α of 20° and the trailing flank 34 may have a normal angle β of 10°.

Figure 5:
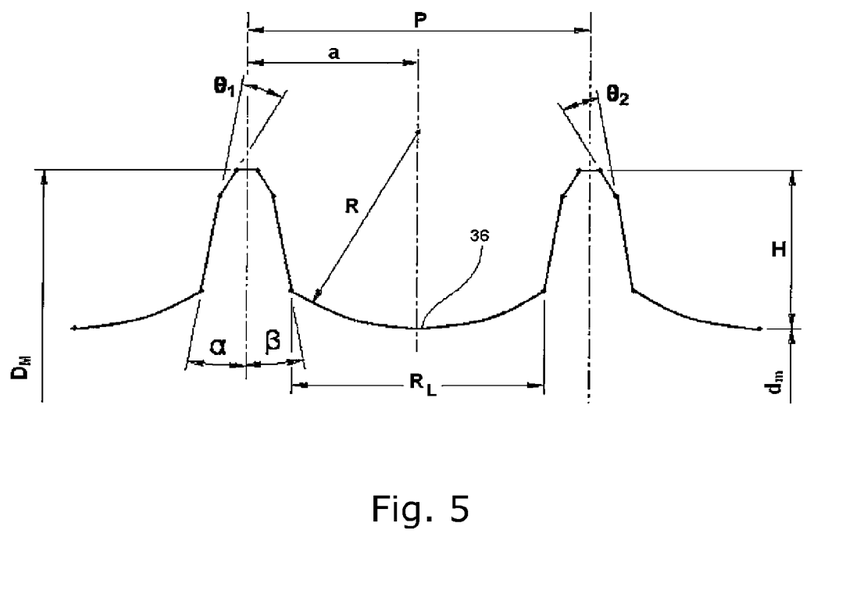
FIG. 5 is an enlarged view of an alternative thread form according to the present disclosure.

Optionally, the normal angle α of the leading flank 32 may be a compound angle as shown in FIG. 5. The leading flank 32 may include a leading compound angle $\theta_1$ from the leading flank 32 surface. Alternatively or in addition, the normal angle β of the trailing flank 34 may be a compound angle $\alpha_2$ shown in FIG. 5. The trailing flank 34 may include a trailing compound angle $\theta_2$ from the trailing flank 34 surface. The leading compound angle $\theta_1$ and the trailing compound angle $\theta_2$ may be approximately the same. Alternatively, the leading compound angle $\theta_1$ may be greater than the trailing compound angle $\theta_2$. In yet another alternative, the leading compound angle $\theta_1$ may be less than the trailing compound angle $\theta_2$. The leading compound angle $\theta_1$ may be between about 1° and 20°. Similarly, the trailing compound angle $\theta_2$ may be between about 1° and 20°.

As shown in FIGS. 3 and 4, the shank portion 36 extending between the trailing flank and the leading flank of adjacent threads may be a arcuate surface having a radius R greater than the thread height. The radius R of the arcuate surface forming the shank portion 36 may be between 1.2 and 1.8 times the thread height H. The thread height H may be determined by the difference between the major diameter $D_M$ and the minor diameter $d_m$ divided by two. In one alternative, the arcuate surface forming the shank portion 36 may have a continuous radius R greater than the thread height. The center of the radius R may be axially positioned a distance approximately half of the pitch P between the threads, identified by reference "a" on FIG. 3. Alternatively, the center of the radius R may be axially positioned closer to the leading thread or the trailing thread as desired. The ratio between the axial length $R_L$ of the shank portion to thread height may be between about 1.5 and 3.0.

As shown in FIGS. 3 through 5, the shank portion 36 may be adapted such that the arcuate surface of the shank portion 36 intersects the flank 32, 34 non-tangentially. Stated another way, at the intersection of the flank 32, 34 and the arcuate shank portion 36, the flank is not tangent to the arcuate surface. A fillet may be provided at the intersection between the flank 32, 34 and the shank portion 36 (not shown).

Figure 2:
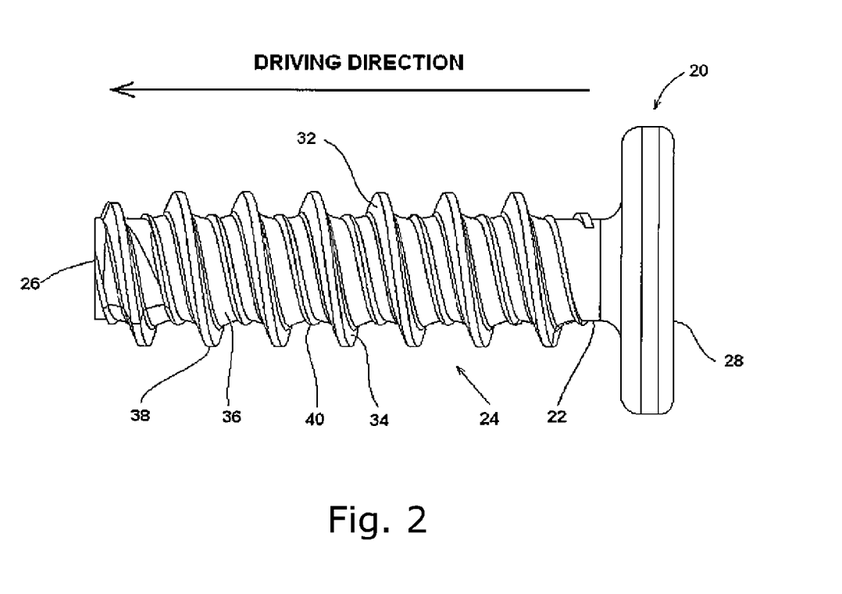
FIG. 2 is a plan view of an alternative threaded fastener of the present disclosure.
Figure 6:
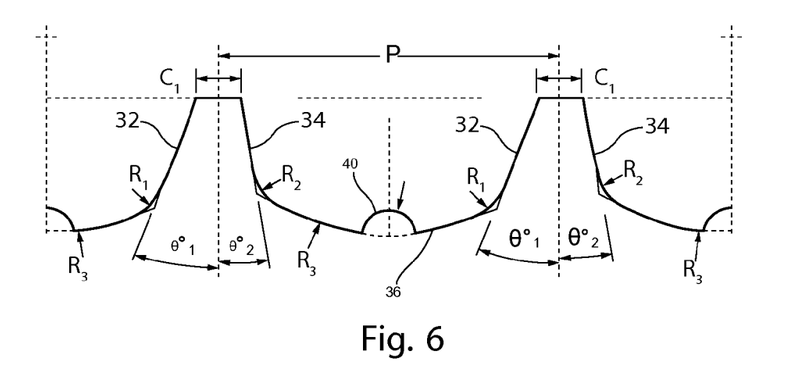
FIG. 6 is an enlarged view of yet another alternative thread form with a minor protrusion according to the present disclosure.

The threaded fastener 20 may have at least one minor protrusion 40 formed along at least a portion of the shank portion 36 of the threaded portions 24 positioned between the trailing flank 34 and the leading flank 32 of adjacent threads as shown in FIGS. 2 and 6. The minor protrusion 40 may be provided to improve the performance of the fastener under vibration. The minor protrusion 40 is not a thread form but a protrusion that may be provided to fill voids between the shank portion 36 and the component material the fastener is threaded into increasing contact area between the thread portion 24 and the component.

Figure 7:
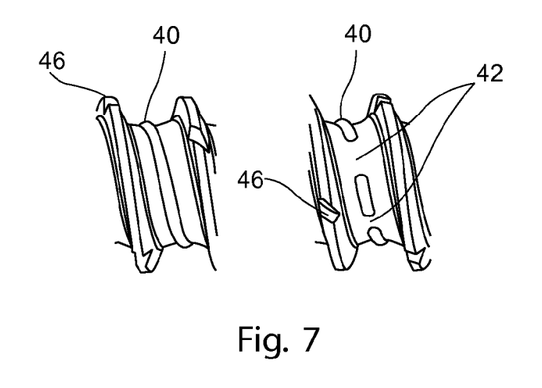
FIG. 7 shows partial plan views of alternative minor protrusions of the thread form of FIG. 6, FIG. 8 are details of alternative profile shapes for the minor protrusions of the thread form of FIGS. 6 and 7.
Figure 8:
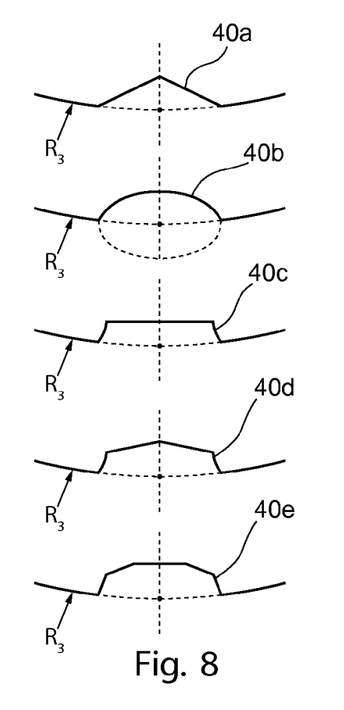

The minor protrusion 40 may be continuous along the shank portion 36 positioned between the trailing flank 34 and the leading flank 32 of adjacent threads as shown in FIG. 7. Alternatively, the minor protrusion 40 may be intermittent along at least a portion of the shank portion 36 by providing intermittent gaps 42 in the minor protrusion 40 as shown in FIG. 7. It is contemplated that the gaps 42 may further improve retention of the threaded fastener in the component as component material flows into the gaps 42 during installation. The height of the minor protrusion 40 may be not more than 30% of the thread height. Alternatively, the height of the minor protrusion 40 may be not more than 20% of the thread height. As shown in FIGS. 6 and 7, at least a part of the minor protrusion 40 may have a cross-sectional shape that is arcuate or semi-circular in shape. Alternatively, as shown in FIG. 8, the minor protrusion 40 may have a cross-sectional shape that is rectangular 40c, elliptical 40b, trapezoidal 40d, triangular 40a, or other non-thread shape that is desired. A lead side of the minor protrusion 40 may have a normal angle between 10° and 60°.

Figure 9:
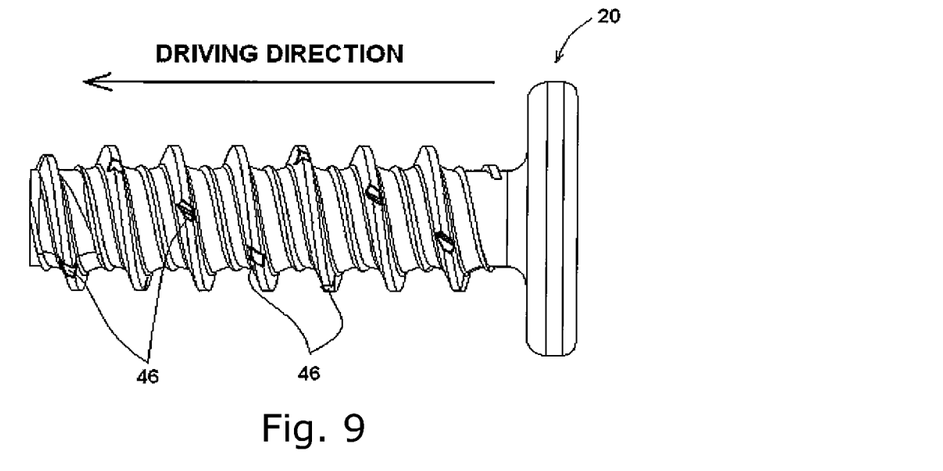
FIG. 9 is a plan view of a threaded fastener with grooves extending transversely through the threads, FIG. 10 are details of alternative profile shapes for the tips of the threads of the present disclosure.

The threaded fastener 20 may include a plurality of grooves 46 extending transversely through the major diameter portion 38 of the threaded portion as shown in FIGS. 7 and 9. Alternatively or in addition, the threaded fastener 20 may include a plurality of grooves 46 extending transversely through the major diameter portion 38 of adjacent threads of the threaded portion. The depth and orientation of the grooves may be varied as desired for the component material the fastener will be threaded into.

Figure 10:
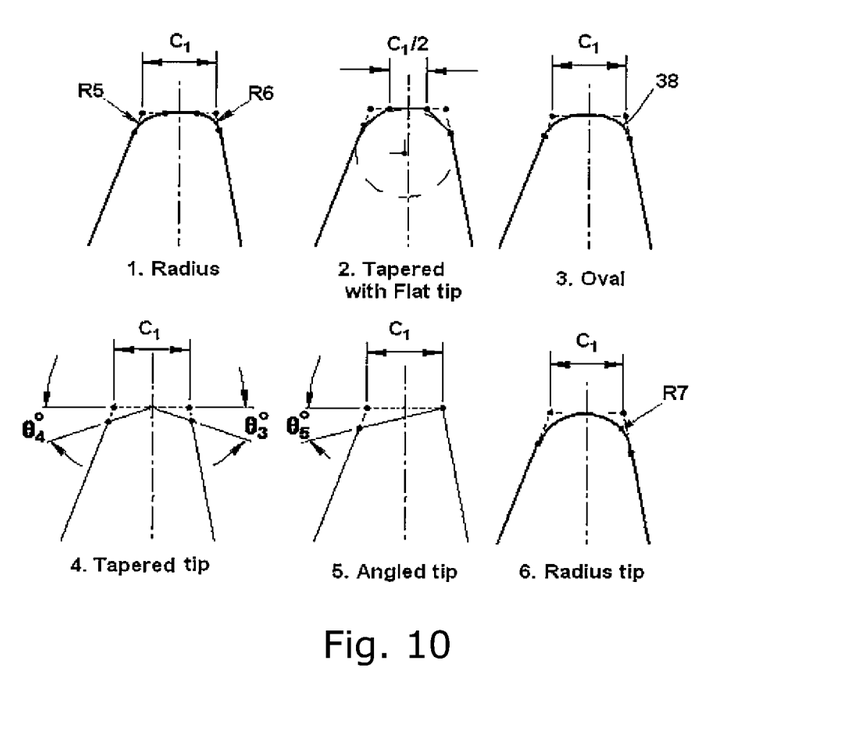

The major diameter portion 38 of the threaded portion, or the thread tip 38 may have a flat surface, an angled surface, an arcuate surface, or other shape as desired. The major diameter portion 38 may be tapered toward the leading flank, the trailing flank, or both, such as shown by alternative examples in FIG. 10. Alternatively, the major diameter portion of the threaded portion may be arcuate such as shown by alternative examples in FIG. 10.

The presently disclosed fasteners may be made from low carbon steel, alloy steel, aluminum, brass, or other material as desired. The threaded fasteners may be made of a material selected as desired adapted to assemble parts made from materials selected from plastic, brass, aluminum, wood, concrete, steel, or other component materials.

Parameters for one application of the present disclosure is shown in FIGS. 11 and 12, in conjunction with FIGS. 3 and 4. Experimental samples of the presently disclosed fasteners were produced and tested and compared with two commercially available comparative fasteners. Sample A is a fastener having a thread form configured as shown in FIG. 5 with a leading normal angle α of 25 degrees and a trailing normal angle β of 25 degrees. Sample B is a fastener having a thread form configured as shown in FIG. 3 with a leading normal angle α of 20 degrees and a trailing normal angle β of 10 degrees. Sample C is a commercially available fastener sold under the trademark Delta PT®. Sample D is a commercially available fastener sold under the trademark Remform®. Tested samples A through D all have a major diameter of 1.6 millimeters.

FIGS. 14 through 17 show plots of the torque measured as the samples were installed into pre-drilled holes in a plastic test block. As shown in FIGS. 14 through 17, as the fasteners are rotated into the test block, the torque gradually increases until the head of the fastener reaches the surface of the block, at which point additional rotation of the fastener provides rapidly increasing clamping torque until failure. In the present tests, the samples failed by strip-out. Strip-out occurs when the shape of the hole deforms and/or the hole enlarges such that the threads of the screw cannot engage the material around the hole enough to tighten the screw. The drive torque was measured as the greatest torque right before the rapid torque rise to failure. Table 1 below provides the drive torque for the samples as tested.

TABLE 1

Drive Torque

|  | Sample A (α = 25, β = 25) | Sample B (α = 20, β = 10) | Sample C Comparative Fasteners | Sample D Comparative Fasteners |
|---|---|---|---|---|
| Mean | 1.090 | 1.119 | 0.999 | 1.162 |
| Std. Dev. | 0.141 | 0.053 | 0.059 | 0.113 |
| Mean + 3 Std Dev | 1.514 | 1.278 | 1.176 | 1.500 |
| Mean − 3 Std Dev | 0.666 | 0.961 | 0.822 | 0.824 |

The failure torque is shown in Table 2. The failure torque was measured as the highest torque achieved before strip-out.

TABLE 2

Failure Torque

|  | Sample A (α = 25, β = 25) | Sample B (α = 20, β = 10) | Sample C Comparative Fasteners | Sample D Comparative Fasteners |
|---|---|---|---|---|
| Mean | 2.135 | 2.135 | 1.849 | 2.326 |
| Std. Dev. | 0.100 | 0.119 | 0.101 | 0.129 |
| Mean + 3 Std Dev | 2.436 | 2.491 | 2.153 | 2.714 |
| Mean − 3 Std Dev | 1.834 | 1.779 | 1.546 | 1.938 |

When the fasteners are used in an assembly application, it is typically desired to install the fasteners to a seating torque greater than the drive torque and less than the failure torque. Fasteners are often installed in commercial applications using automated drivers that may have variability from one screw installation to another. For this reason, it may be useful to provide a seating torque within a range of seating torques, or a seating torque window. A larger seating torque window may reduce strip-out failures by providing for greater variability of the screw driver.

Figure 13:
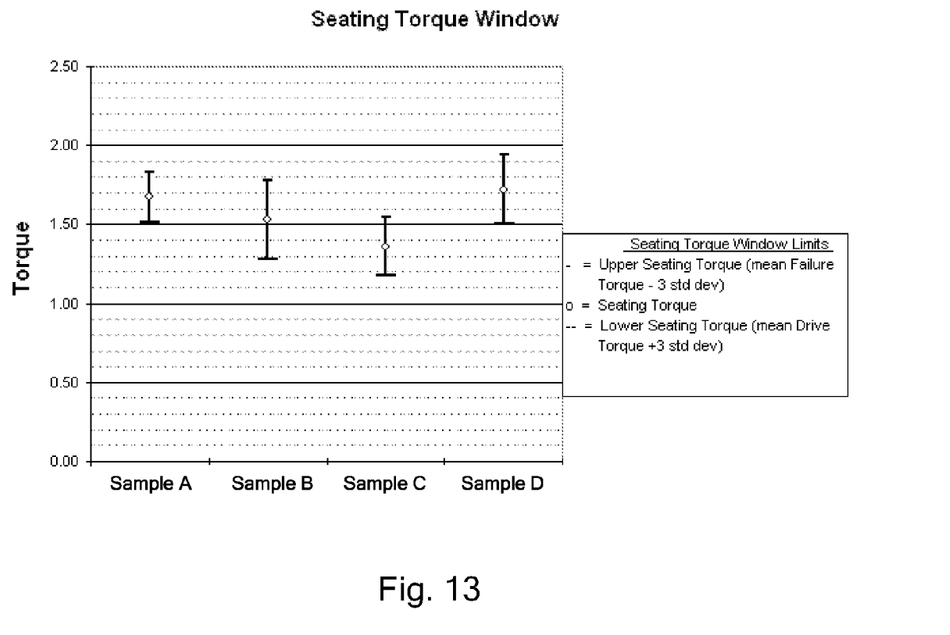
FIG. 13 is a chart showing a seating torque window for sample fasteners.
Figure 14:
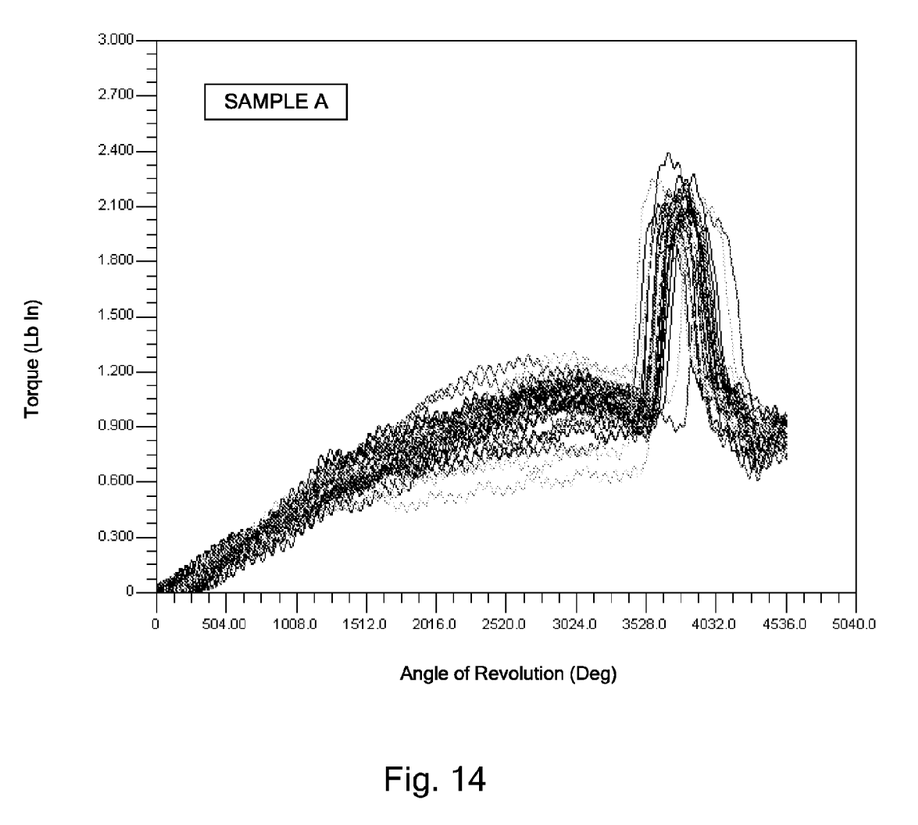
FIG. 14 is a graph of torque versus angle of rotation for present fastener Samples A.
Figure 15:
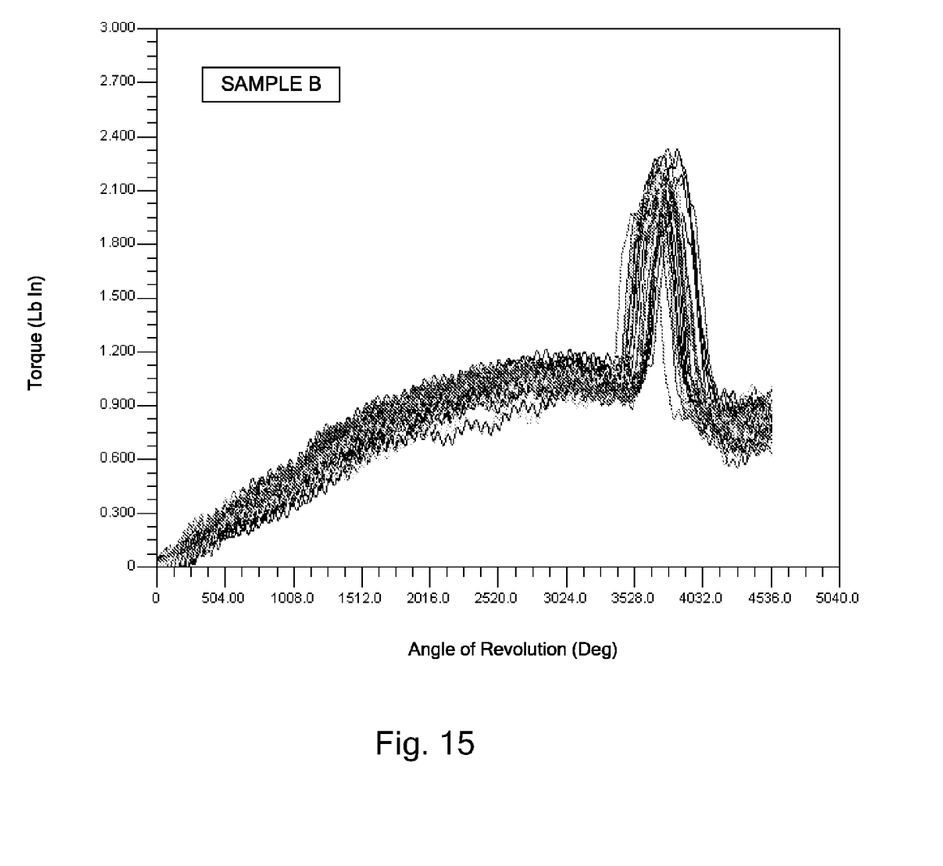
FIG. 15 is a graph of torque versus angle of rotation for present fastener Samples B.
Figure 16:
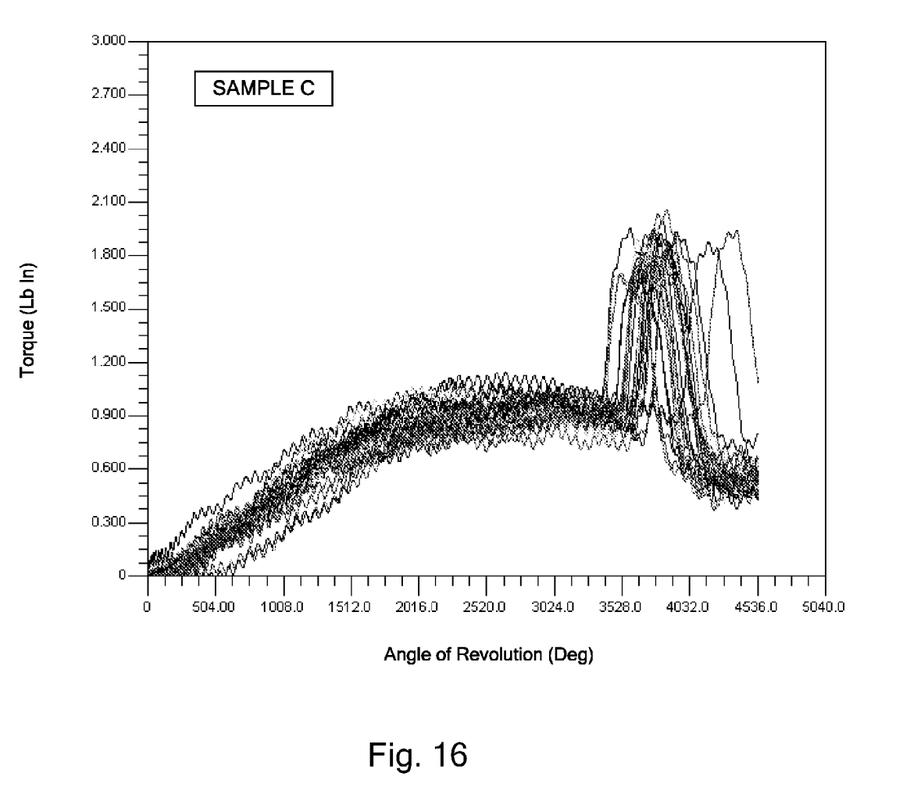
FIG. 16 is a graph of torque versus angle of rotation for comparative fastener Samples C.
Figure 17:
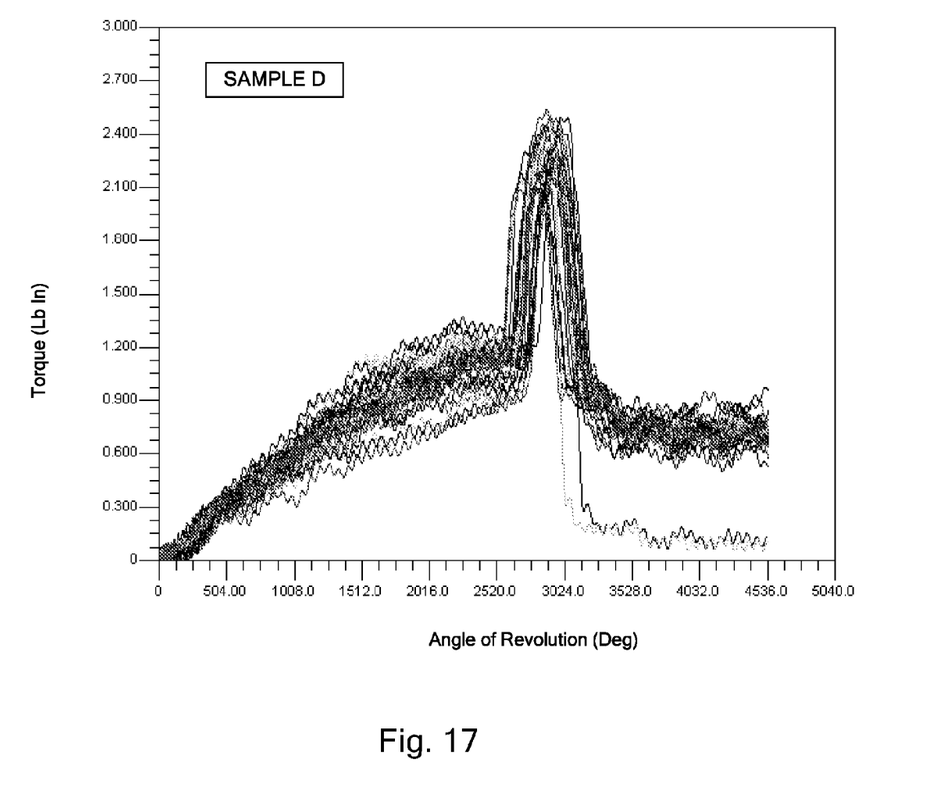
FIG. 17 is a graph of torque versus angle of rotation for comparative fastener Samples D.

To determine the seating torque window, an upper seating torque and lower seating torque are calculated. The upper seating torque is the mean failure torque minus three standard deviations of the failure torque data. The lower seating torque is the mean drive torque plus three standard deviations of the drive torque data. The seating torque is selected as the midpoint between the upper and lower seating torques. As shown in FIG. 13 and Table 3, Sample B was the highest performing fastener of the samples because the seating torque window was the greatest.

TABLE 3

Seating Torque Window

|  | Sample A (α = 25, β = 25) | Sample B (α = 20, β = 10) | Sample C Comparative Fasteners | Sample D Comparative Fasteners |
|---|---|---|---|---|
| Upper Seating Torque | 1.834 | 1.779 | 1.546 | 1.938 |
| Seating Torque | 1.674 | 1.528 | 1.361 | 1.719 |
| Lower Seating Torque | 1.514 | 1.278 | 1.176 | 1.500 |
| Seating Torque Window | 0.319 | 0.501 | 0.370 | 0.438 |

The disclosed threaded fastener may comprise a threaded portion with a ratio of pitch diameter to minor diameter less than 1.28, and the threaded portion with a major diameter portion, a leading flank having a normal angle between 10° and 60°, a trailing flank having a normal angle between 1° and 30°, and a shank portion extending between the trailing flank and the leading flank of adjacent threads of a arcuate surface having a radius greater than the thread height. The ratio between the axial length of the shank portion to thread height may be between 1.5 and 3.0.

The arcuate surface forming the shank portion of the threaded fastener may have a radius between 1.2 and 1.8 times the thread height.

The normal angle of the leading flank of the threaded portion may be greater than the normal angle of the trailing flank of the threaded portion. Alternatively, the normal angle of the leading flank of the threaded portion may be between 1.5 and 2.5 times the normal angle of the trailing flank of the threaded portion.

In one example of the disclosed threaded faster, the normal angle of the leading flank and the normal angle of the trailing flank are substantially the same. In yet another alternative, the normal angle of the leading flank and the normal angle of the trailing flank may be compound angles.

The threaded fastener is adapted to assemble parts made from materials selected from the group consisting of plastic, brass, aluminum, wood, concrete, and steel.

The threaded fastener may include a plurality of grooves extending transversely through the major diameter portion of the threaded portion. Alternatively, the threaded fastener may include a plurality of grooves extending transversely through the major diameter portion of adjacent threads of the threaded portion.

The major diameter portion of the threaded portion may be tapered toward the leading flank, the trailing flank, or both. Alternatively, the major diameter portion of the threaded portion is arcuate.

The threaded fastener may have at least one minor protrusion is formed along at least a portion of the shank portion of the threaded portions positioned between the trailing flank and the leading flank of adjacent threads. The minor protrusion may be continuous along the shank portion positioned between the trailing flank and the leading flank of adjacent threads. Alternatively, the minor protrusion is intermittent along at least a portion of the shank portion positioned between the trailing flank and the leading flank of adjacent threads.

If present, the minor protrusion may have a height not more than about 30% of the thread height. Alternatively, the height of the minor protrusion is not more than 20% of the thread height. At least a part of the minor protrusion may have a cross-sectional shape selected from the group consisting of arcuate, rectangular, elliptical, trapezoidal, and triangular. Additionally, a lead side of the minor protrusion may have a normal angle between about 10° and 60°.

Also disclosed is a threaded fastener comprising having a threaded portion with a major diameter portion, a leading flank having a normal angle between 1° and 60°, a trailing flank having a normal angle between 1° and 60°, and a shank portion extending between the trailing flank and the leading flank of adjacent threads, and at least one minor protrusion formed along at least a portion of the shank portion of the threaded portions positioned between the trailing flank and the leading flank of adjacent threads.

The minor protrusion may be continuous along the shank portion positioned between the trailing flank and the leading flank of adjacent threads. Alternatively, the minor protrusion is intermittent along at least a portion of the shank portion positioned between the trailing flank and the leading flank of adjacent threads.

The minor protrusion may have a height not more than about 30% of the thread height. Alternatively, the height of the minor protrusion is not more than 20% of the thread height. At least a part of the minor protrusion may have a cross-sectional shape selected from the group consisting of arcuate, rectangular, elliptical, trapezoidal, and triangular. Additionally, a lead side of the minor protrusion may have a normal angle between about 10° and 60°.

In one alternative, the leading flank of the threaded fastener may have a normal angle between about 10° and 60°, and the trailing flank may have a normal angle between about 1° and 30°.

This invention has been described with reference to illustrative embodiments and is not meant to be construed in a limiting sense. It will be apparent to one skilled in the art that elements or process steps from one or more embodiments described herein may be used in combination with elements or process steps from one or more other embodiments described herein, and that the present invention is not limited to the specific embodiments provided herein but only as set forth in the accompanying claims. Various modifications of the illustrative embodiments, as well as additional embodiments to the invention will be apparent to persons skilled in the art upon reference to this description.

What is claimed is:

1. A threaded fastener comprising:
    a fastener having a threaded portion with a ratio of pitch diameter to minor diameter less than 1.28, and
    the threaded portion consisting of, in series, a major diameter portion, a leading flank, a shank portion, and a trailing flank,
    the leading flank consisting of a first profile defined by a normal angle of 20°,
    the trailing flank consisting of a second profile defined by a normal angle of 10°, and
    the shank portion extending between the trailing flank and the leading flank of adjacent threads and consisting of an arcuate surface having a constant radius greater than the thread height, wherein the constant radius forming the shank portion is between 1.2 and 1.8 times the thread height.

2. The threaded fastener as claimed in claim 1 where the fastener is adapted to assemble parts made from materials selected from the group consisting of plastic, brass, aluminum, wood, concrete, and steel.

3. The threaded fastener as claimed in claim 1 further comprising:
    a plurality of grooves extending transversely through the major diameter portion of the threaded portion.

4. The threaded fastener as claimed in claim 1 further comprising:
    a plurality of grooves extending transversely through the major diameter portion of adjacent threads of the threaded portion.

5. The threaded fastener as claimed in claim 1 where the major diameter portion of the threaded portion is tapered toward the lead flank, the trailing flank, or both.

6. The threaded fastener as claimed in claim 1 where the major diameter portion of the threaded portion is arcuate.

7. The threaded fastener as claimed in claim 1 further comprising
    a thread-forming portion of at least HRC 50 hardness adapted to thread the fastener into a substrate.

8. The threaded fastener as claimed in claim 7, where the thread-forming portion has a shape selected from a group consisting of bilobular, trilobular, quadlobular and pentalobular.

9. The threaded fastener as claimed in claim 7, where the thread-forming portion has a pentalobular shape.

10. The threaded fastener as claimed in claim 7, where up to five threads adjacent the thread-forming portion are hardened to at least HRC 50 hardness.

11. The threaded fastener as claimed in claim 7, where the thread-forming portion is between 3 and 7 thread pitches in length.

12. The threaded fastener as claimed in claim 1, the major diameter portion having a surface selected from the group consisting of a flat surface, an angled surface tapered toward the leading flank, an angled surface tapered toward the trailing flank, angled surfaces tapered toward the leading flank and the trailing flank, radius surface, and an arcuate surface.

* * * * *